(12) United States Patent
Aikawa et al.

(10) Patent No.: US 8,094,890 B2
(45) Date of Patent: Jan. 10, 2012

(54) BIOMETRIC AUTHENTICATION APPARATUS, BIOMETRIC AUTHENTICATION SYSTEM, IC CARD AND BIOMETRIC AUTHENTICATION METHOD

(75) Inventors: Makoto Aikawa, Sagamihara (JP); Shoko Hatanaka, Tokyo (JP); Kazunori Hashimoto, Fujisawa (JP); Shigeyuki Ito, Zushi (JP); Yutaka Takami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1073 days.

(21) Appl. No.: 11/752,349

(22) Filed: May 23, 2007

(65) Prior Publication Data

US 2008/0056544 A1    Mar. 6, 2008

(30) Foreign Application Priority Data

Jun. 5, 2006    (JP) ................... 2006-155852

(51) Int. Cl.
*G06K 9/00*    (2006.01)
(52) U.S. Cl. ........ 382/115; 340/5.53; 340/5.83; 356/71; 713/186; 283/68; 283/69
(58) Field of Classification Search .......... 382/115–127; 340/5.53, 5.83; 356/71; 713/186; 283/69, 283/68
See application file for complete search history.

(56) References Cited

U.S. PATENT DOCUMENTS

| | | | | |
|---|---|---|---|---|
| 5,761,309 | A | * | 6/1998 | Ohashi et al. ................. 713/156 |
| 6,134,659 | A | * | 10/2000 | Sprong et al. ................. 713/190 |
| 7,266,224 | B2 | * | 9/2007 | Sukegawa ..................... 382/118 |
| 2002/0095389 | A1 | * | 7/2002 | Gaines ............................ 705/67 |
| 2006/0210126 | A1 | * | 9/2006 | Cho .............................. 382/124 |

FOREIGN PATENT DOCUMENTS

| | | |
|---|---|---|
| JP | 2001-344213 | 12/2001 |
| JP | 2006-099374 | 4/2006 |

* cited by examiner

*Primary Examiner* — Wesley Tucker
(74) *Attorney, Agent, or Firm* — Antonelli, Terry, Stout & Kraus, LLP.

(57) ABSTRACT

A biometric authentication apparatus for identifying a subject person by using biometric information of a user has memories and a processing unit for performing biometric authentication. The memories and store a remaining trial number whose value is reduced each time biometric authentication fails. The processing unit generates a lower limit value smaller than the remaining trial number at the start of biometric authentication, performs biometric authentication until the reduced remaining trial number becomes equal to or smaller than the lower limit value, and generate alarm data for issuing alarm to the user when the reduced trial number becomes equal to or smaller than the lower limit value.

5 Claims, 12 Drawing Sheets

FIG.6A APPLICATION PROGRAM SELECT COMMAND
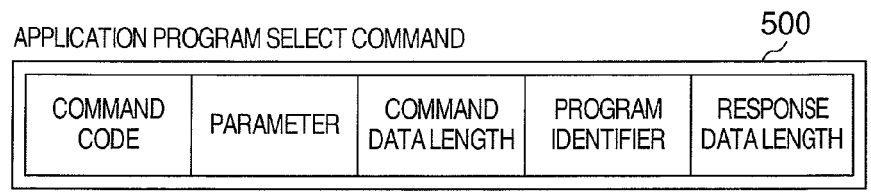
FIG.6B APPLICATION PROGRAM SELECT RESPONSE
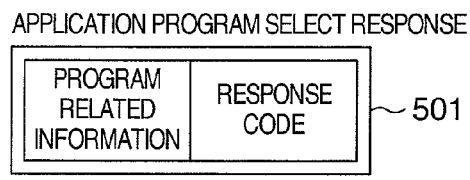
FIG.7A APPARATUS AUTHENTICATION START COMMAND
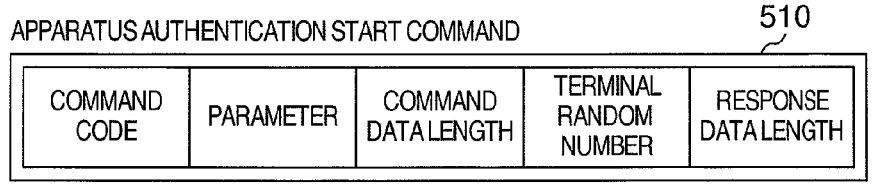
FIG.7B APPARATUS AUTHENTICATION START RESPONSE
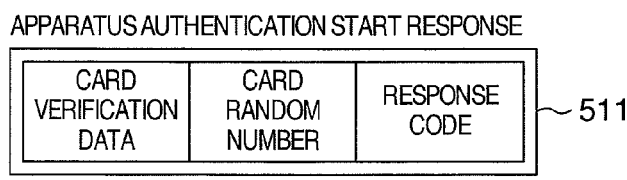
FIG.8A APPARATUS AUTHENTICATION EXECUTE COMMAND
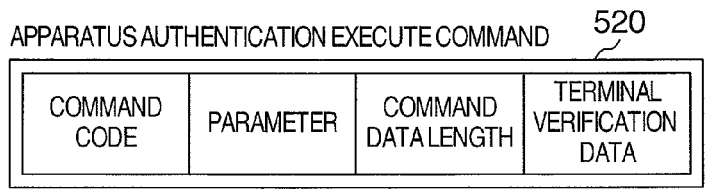
FIG.8B APPARATUS AUTHENTICATION EXECUTE COMMAND
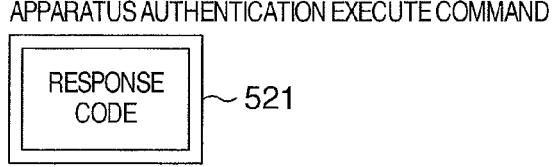

USER INFORMATION READ COMMAND

USER INFORMATION READ RESPONSE

BIOMETRIC INFORMATION RELATED DATA READ COMMAND

BIOMETRIC INFORMATION RELATED DATA READ RESPONSE

BIOMETRIC AUTHENTICATION HISTORY READ COMMAND

BIOMETRIC AUTHENTICATION HISTORY READ RESPONSE

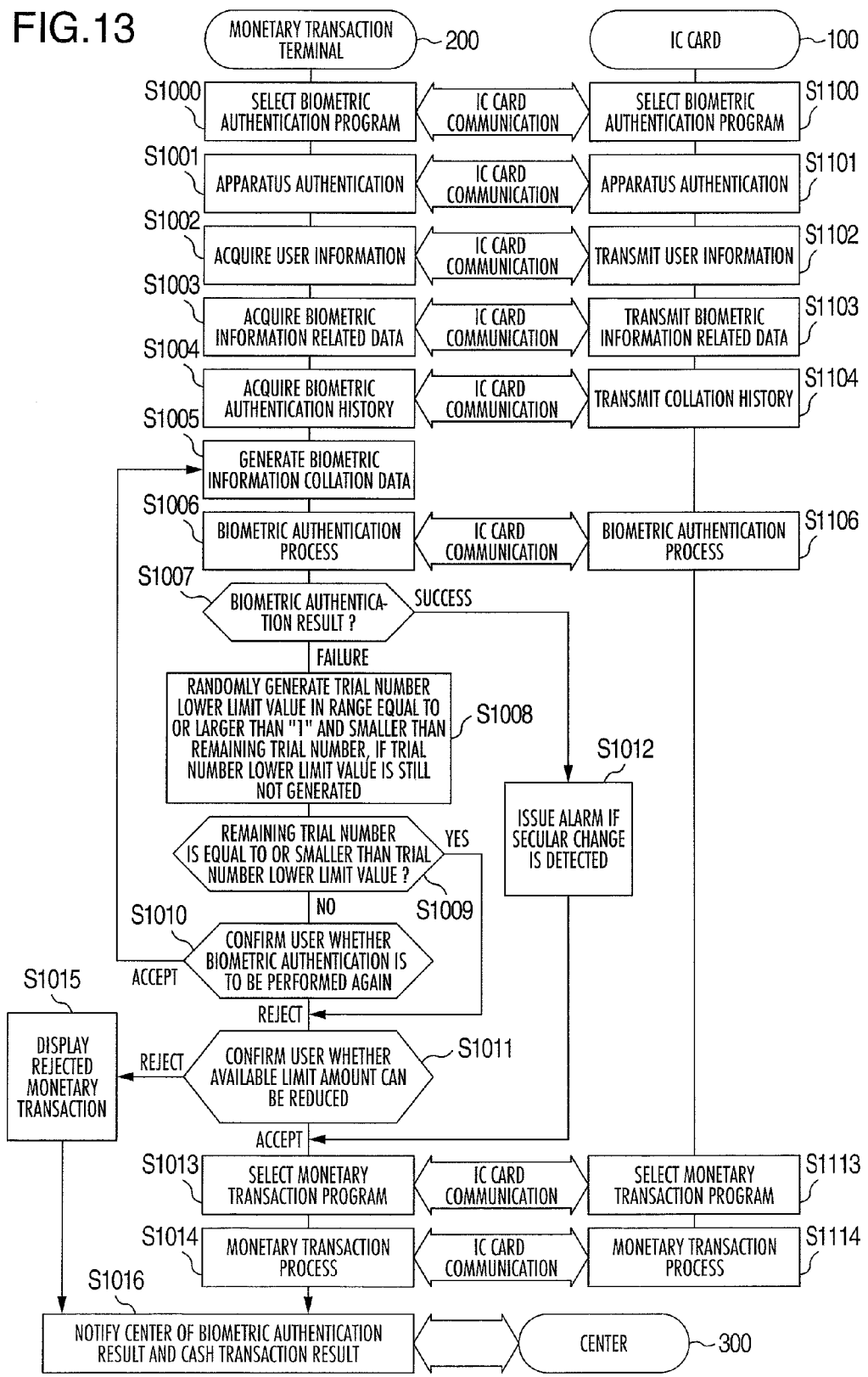

BIOMETRIC AUTHENTICATION APPARATUS, BIOMETRIC AUTHENTICATION SYSTEM, IC CARD AND BIOMETRIC AUTHENTICATION METHOD

INCORPORATION BY REFERENCE

The present application claims priority from Japanese application JP2006-155852 filed on Jun. 5, 2006, the content of which is hereby incorporated by reference into this application.

BACKGROUND OF THE INVENTION

1. Field of the Invention

The present invention relates to a biometric authentication system which uses an IC card for identifying a subject person through biometric authentication.

2. Description of the Related Art

Information which only a subject person knows, such as a personal identification number and a password, is generally used as a means for identifying the subject person who conducts monetary transaction or whose room entrance or exit is checked, by using information apparatus such as computers. However, the personal identification number and password have a disadvantage of ease of identity theft if these are stolen by a third party. To overcome this disadvantage, attention has recently been paid to biometric authentication using biometric information such as fingerprints and irises which information is difficult for the third party to steal and is different for each individual.

As an individual identification method using biometric authentication, the following method is known being disclosed in JP-A-2001-344213. Biometric information of a subject person is stored beforehand in an IC card (biometric information stored in an IC card is hereinafter called "registration data"). When the subject person is to be identified, biometric information acquired with a biometric information sensor is input to the IC card (this information is hereinafter called "collation information"). The IC card executes a collation process for the registration data and collation data to thereby confirm whether the subject person is a real person. A binary judgement of whether the registration data and collation data are perfectly coincident or not cannot be made by biometric authentication. Therefore, judgement is made by calculating a similarity degree and an inconsistency degree between the registration data and collation data by using a specific algorithm, and comparing the calculation result with a preset reference value (threshold value). FIG. 18 shows an example of an inconsistency degree distribution for the registration data and collation data. In FIG. 18, the abscissa represents an inconsistency degree of collation, and the ordinate represents an occurrence frequency. An occurrence frequency curve 901 shows collation between registration data and collation data of a subject person, and an occurrence frequency curve 902 shows collation between registration data of the subject person and collation data of a third party. Normally, the curve 901 positions to the left of the curve 902 (has a smaller inconsistency degree). A biometric authentication threshold value 903 is set between the curves. If the inconsistency degree is smaller than the biometric authentication threshold value, it is judged that the subject person is a real person, whereas if the inconsistency degree is larger than the biometric authentication threshold value, it is judged that the subject person is a pretended person.

SUMMARY OF THE INVENTION

As shown in FIG. 18, generally the occurrence frequency curves 901 and 902 are overlapped. Therefore, even the subject person is judged as the third party if the inconsistency degree is in a region 910. A possibility of judging even the subject person as a third party becomes large, if biometric information registered in the IC card has a poor precision or if an inconsistency degree between the biometric information registered in the IC card and the present biometric information becomes large because of aging of the subject person, measurement errors or the like. If this phenomenon occurs, for example, in monetary transaction by a cash card or a credit card using IC card biometric authentication, even the subject person cannot perform monetary transaction. There is an approach to registering beforehand the number of trials of biometric authentication (the number of trials of biometric authentication permitting authentication failure up to this number), and decrementing the trial number by "1" in the IC card each time the biometric authentication fails. With this arrangement, when the trial number becomes "0", the biometric authentication function of the IC card cannot be used and biometric authentication may not be conducted. If the biometric information registered in the IC card having the above-described function has a large inconsistency degree from the present biometric information, the biometric authentication function of the IC card is likely to be unusable.

The present invention provides a biometric authentication apparatus for identifying a subject person by using biometric information of a user, comprising: a memory for storing data; and a processing unit for executing biometric authentication, wherein: the memory stores a remaining trial number whose value is reduced each time biometric authentication performed by the processing unit fails; and the processing unit generates a lower limit value smaller than a remaining trial number at the start of biometric authentication, executes biometric authentication until the reduced remaining trial number becomes equal to or smaller than the lower limit value, and generates alarm data for alarming the user when the reduced remaining trial number is equal to or smaller than the lower limit value.

The present invention provides a biometric authentication apparatus for identifying a subject person by using biometric information of a user, comprising a memory for storing data and a processing unit for performing biometric authentication wherein: the memory stores first biometric information of the user, a biometric authentication threshold value which is a reference value to be used when a failure or a success of biometric authentication of the user is judged by a magnitude of a value, and a change detection threshold value which is a reference value to be used when a presence or an absence of a change detection of the first biometric information of the user is judged by a magnitude of a value; and the processing unit acquires second biometric information of the user, compares the first biometric information and the acquired second biometric information to calculate an inconsistency degree quantitatively representative of a difference therebetween, and if the calculated inconsistency degree is smaller than the biometric authentication threshold value and larger than the change detection threshold value, generates notice data for notifying the user of a change detection of the first biometric information.

The present invention provides the biometric authentication apparatus wherein: the memory stores a past history of biometric authentication of the user and a secular change detection threshold value which is a reference value to be used when a presence or an absence of a secular change detection of first biometric information of the user is judged by a magnitude of a value; and the processing unit generates notice data for notifying the user of a secular change detection of the first biometric information, if a calculated inconsistency degree is larger than the secular change threshold value.

The present invention further provides a biometric authentication system comprising: an IC card; and a biometric authentication apparatus for identifying a subject person through biometric authentication using biometric information of a user by communicating with said IC card, wherein: the IC card has a first communication unit for communicating with the biometric authentication apparatus, a first memory for storing data, and a first processing unit for performing biometric authentication, wherein the first memory stores a remaining trial number whose value is reduced each time biometric authentication by the first processing unit fails; and the biometric authentication apparatus has a second communication unit for communicating with the biometric authentication apparatus and a second processing unit for performing biometric authentication, wherein the second processing unit generates a lower limit value smaller than a remaining trial number at the start of biometric authentication, executes biometric authentication until the reduced remaining trial number becomes equal to or smaller than the lower limit value, and generates alarm data for alarming the user when the reduced remaining trial number is equal to or smaller than the lower limit value.

The present invention provides a biometric authentication system comprising: an IC card; and a biometric authentication apparatus for identifying a subject person through biometric authentication using biometric information of a user by communicating with said IC card, wherein: the IC card has the first communication unit for communicating with the biometric authentication apparatus, the first memory for storing biometric information of the user, and the first processing unit for performing biometric authentication, wherein the first processing unit acquires externally second biometric information of the user, and compares the first biometric information with the acquired second biometric information to calculate an inconsistency degree quantitatively representative of a difference therebetween; and the biometric authentication apparatus has the second communication unit for communicating with the biometric authentication apparatus, a second memory for storing data, and the second processing unit for performing biometric authentication, wherein the second memory stores a change detection threshold value which is a reference value to be used when a presence or an absence of a change detection of the first biometric information of the user is judged by a magnitude of a value, the second processing unit acquires the inconsistency degree calculated by the IC card, compares the acquired inconsistency degree with the change detection threshold value, and if the inconsistency degree is smaller than the change detection threshold value, generates notice data for notifying the user of a change detection of the first biometric information.

The present invention provides an IC card for identifying a subject person through biometric authentication using biometric information of a user, comprising: a communication unit for communicating with an external; a memory for storing data regarding biometric authentication; and a processing unit for performing biometric authentication, wherein: the memory stores first biometric information of the user, a biometric authentication threshold value which is a reference value to be used when a failure or a success of biometric authentication of the user is judged by a magnitude of a value, and a change detection threshold value which is a reference value to be used when a presence or an absence of a change detection of the first biometric information of the user is judged by a magnitude of a value; and the processing unit acquires externally second biometric information of the user, compares the first biometric information and the acquired second biometric information to calculate an inconsistency degree quantitatively representative of a difference therebetween, and if the calculated inconsistency degree is smaller than the biometric authentication threshold value and larger than the change detection threshold value, generates notice data for notifying the user of a change detection of the first biometric information.

The present invention provides a biometric authentication method for performing biometric authentication by biometric information of a user by using an IC card and a biometric authentication apparatus for communicating with the IC card, wherein: the IC card records a remaining trial number whose value is reduced each time biometric authentication fails; and the processing unit generates a lower limit value smaller than a remaining trial number at the start of biometric authentication, executes biometric authentication until the reduced remaining trial number becomes equal to or smaller than the lower limit value, and generates alarm data for alarming the user when the reduced remaining trial number is equal to or smaller than the lower limit value.

The present invention provides a biometric authentication method for performing biometric authentication by biometric information of a user by using an IC card and a biometric authentication apparatus for communicating with the IC card, wherein: the IC card records first biometric information of the user, acquires externally second biometric information of the user, and compares aid first biometric information with the acquired second biometric information to calculate an inconsistency degree quantitatively representative of a difference therebetween; and the biometric authentication apparatus records a change detection threshold value which is a reference value to be used when a presence or an absence of a change detection of the first biometric information of the user is judged by a magnitude of a value, acquires externally second biometric information of the user, compares the first biometric information and the acquired second biometric information, acquires the change detection threshold value calculated by the IC card, and if the inconsistency degree is larger than the change detection threshold value, detects a change in the first biometric information of the user.

The present invention provides a biometric authentication method for performing biometric authentication by biometric information of a user by using an IC card wherein: the IC card records first biometric information of the user, a biometric authentication threshold value which is a reference value to be used for judgement of a success or a failure of biometric authentication, and a change detection threshold value which is a reference value for detection of a change in biometric information of the user, acquires externally second biometric information of the user, compares the first biometric information with the acquired second biometric information to calculate an inconsistency degree quantitatively representative of a difference therebetween, and if the inconsistency degree is smaller than the biometric authentication threshold value and larger than the change detection threshold value, detects a change in the first biometric information of the user.

The present invention realizes an IC card, a biometric authentication apparatus and a biometric authentication method capable of providing proper services without lowering convenience of a user, even in the case in which an inconsistency degree becomes large between the biometric information registered in the IC card and the present biometric information, and although the subject person is a real person, identifying the subject person by biometric authentication fails.

Other objects, features and advantages of the invention will become apparent from the following description of the embodiments of the invention taken in conjunction with the accompanying drawings.

BRIEF DESCRIPTION OF THE DRAWINGS

FIGS. 6A and 6B show formats of an application program select command 500 and an application program select response 501.

FIGS. 7A and 7B show format of an apparatus authentication start command 510 and an apparatus authentication start response 511.

FIGS. 8A and 8B show formats of an apparatus authentication execute command 520 and an apparatus authentication execute response 521.

FIG. 13 is a flow chart illustrating operation to be executed between the IC card 100 and monetary transaction terminal 200.

DESCRIPTION OF THE EMBODIMENTS

Preferred embodiments reducing the present invention in practice will be described.

With reference to the accompanying drawings, description will be made on embodiments of a biometric authentication apparatus, a biometric authentication system, an IC card and a biometric authentication method of the present invention.

First Embodiment

Figure 1:
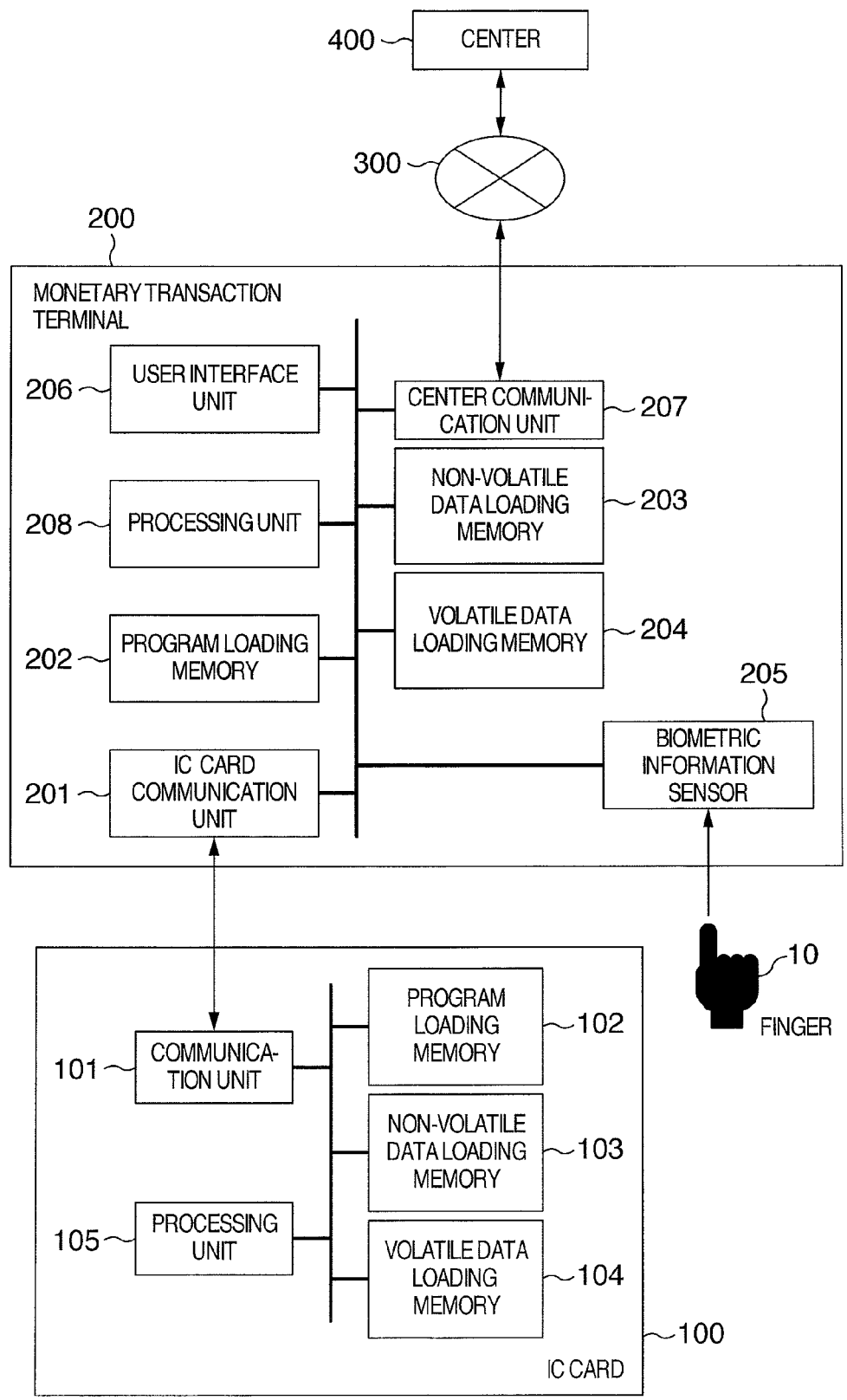
FIG. 1 is a diagram showing the structure of a biometric authentication system according to a first embodiment.

The first embodiment will be described. FIG. 1 is a diagram showing the structure of the first embodiment of the present invention. In FIG. 1, reference numeral 100 represents an IC card, reference numeral 200 represents a monetary transaction terminal, reference numeral 300 represents a network, and reference numeral 400 represents a center. The IC card 100 is owned by a user of the monetary transaction terminal 200, and used for securely performing personal identification and monetary transaction processes using the IC card 100. In this embodiment, although it is described that the IC card 100 is used as a monetary card such as a cash card and a credit card, the present invention is not limited to the monetary transaction process, but is also applicable to the case in which biometric authentication to be executed by the IC card 100 is utilized for room entrance and exit, and access management of network use. Further, although it is described that the monetary transaction terminal 200 is a window terminal or an automated teller machine for monetary transactions using a cash card or a credit card, the present invention is not limited to monetary transaction processes, but is also applicable to other terminals so long as biometric authentication processes are executed by using the IC card 100. The present invention is also applicable to an integrated configuration in which the monetary transaction terminal 200 and IC card 100 are always connected for communications. The IC card 100 may have a shape of a general IC card, and the present invention is also applicable to hardware such as a memory card and a system LSI. For example, an IC chip, a system LSI and the like having an IC card function may also be used. It may therefore be a mobile terminal or the like in an integrated form by connection to an IC chip, a system LSI or the like having an IC card function. In this case, the mobile terminal and IC chip or the like may have both connection contacts, or the IC chip or the like may be fixed directly to the substrate of the mobile terminal, to thereby make current flow therebetween. Alternatively, the mobile terminal and IC chip or the like may be connected in a non-contact manner via electromagnetic induction, radio waves or the like.

Next, description will be made on the internal structure of the IC card 100. The IC card 100 has a communication unit 101, a program loading memory 102, a non-volatile data loading memory 103, a volatile data loading memory 104 and a processing unit 105. The communication unit 101 is used for the IC card 100 to communicate with an external. It may be considered to use contact communications stipulated, for example, in the International Standard Specifications ISO/IEC7816 or non-contact communications stipulated in the International Standard Specifications ISO/IEC14443. The present invention is also applicable to communications stipulated in other Specifications. The program loading memory 102 has a function of permanently storing programs loaded in the IC card 100, and is made of a non-volatile semiconductor memory such as a read only memory (ROM) and an electrical erasable programmable read only memory (EEPROM). The non-volatile data storing memory 103 is a memory which retains arbitrary data even if a power supply to the IC card 100 is intercepted, and is made of a non-volatile semiconductor memory such as EEPROM. The volatile data loading memory 104 is a memory which stores temporary data allowed to be erased when a power supply to the IC card 100 is intercepted, and is made of a volatile semiconductor memory such as a random access memory (RAM). The processing unit 105 controls the whole IC card 100, and upon reception of a control command via the communication unit 101, executes a process corresponding to the received control command in accordance with a program stored in the program loading memory 102, and transmits a corresponding response to an external via the communication unit 101.

Next, description will be made on the internal structure of the monetary transaction terminal 200. The monetary transaction terminal 200 has an IC card communication unit 201, a program loading memory 202, a non-volatile data loading memory 203, a volatile data loading memory 204, a biometric information sensor 205, a user interface unit 206, a center communication unit 207 and a processing unit 208. The IC card communication unit 201 is used for controlling the IC card 100. It may be considered to use contact communications stipulated, for example, in the International Standard Specifications ISO/IEC7816 or non-contact communications stipulated in the International Standard Specifications ISO/IEC14443. The present invention is also applicable to communications stipulated in other Specifications. The program loading memory 202 has a function of permanently storing programs possessed by the monetary transaction terminal 200, and is made of a hard disc, a semiconductor memory or the like. The non-volatile data storing memory 203 has a function of storing permanent data possessed by the monetary transaction terminal 200, and is made of a hard disc, a semiconductor memory or the like. The volatile data loading memory 204 has a function of storing temporary data to be used by the monetary transaction terminal 200, and is made of a hard disc, a semiconductor memory or the like. The biometric information sensor 205 has a function of reading biometric information of a user. In this embodiment, although it is assumed to read a fingerprint or a finger vein pattern as the biometric information, the present invention is also applicable to reading other biometric information. The user interface unit 206 has a display function of providing a user of the monetary transaction terminal with visual information such as images and characters or audio information, and an input function of allowing a user of the monetary transaction terminal 200 to input necessary information. The display function may be realized by a cathode ray tube display or a liquid crystal display. The input function may be realized by a keyboard or a touch panel. The center communication unit 207 is used for communications with a center 400, and has a function of connecting a network 300 such as a public network including a telephone network and the Internet, and a private network. The processing unit 208 controls the whole monetary transaction terminal 200, and executes a biometric authentication process using the IC card 100 and a monetary transaction process using the IC card 100.

Figure 2:
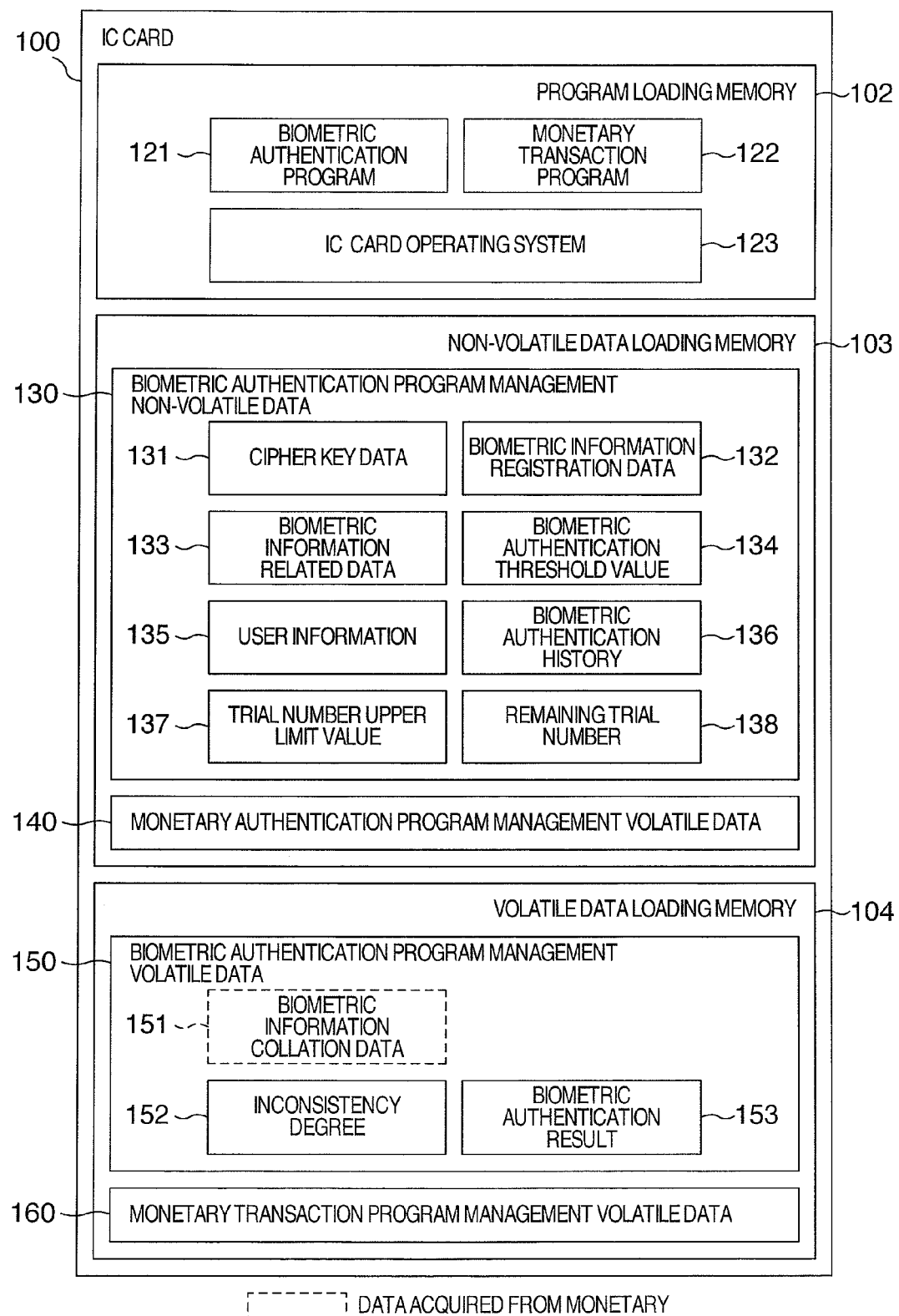
FIG. 2 is a diagram showing the structure of programs and data loaded in an IC card 100.

Next, with reference to FIG. 2, description will be made on the structures of programs and data loaded in the IC card 100. FIG. 2 shows the details of programs stored in the program loading memory 102 of the IC card 100, data stored in the non-volatile data loading memory 103 and data stored in the volatile data loading memory 104. The program loading memory 102 stores a biometric authentication program 121, a monetary transaction program 122 and an IC card operating system 123. The biometric authentication program 121 is an application program to be used for executing a biometric authentication process using the IC card 100. The monetary transaction program 122 is an application program to be used for executing a monetary transaction process using the IC card 100. The IC card operating system 123 is a system program for providing fundamental functions necessary for executing the biometric authentication program 121 and monetary transaction program 122. The IC card operating system 123 may be, for example, MULTOS (registered trademark). The present invention is also applicable to using other operating systems.

The non-volatile data loading memory 103 stores biometric authentication program management non-volatile data 130 and monetary transaction program management non-volatile data 140. The biometric authentication program management non-volatile data 130 is non-volatile data managed by the biometric authentication program 121, and is managed by the IC card operating system 123 so as not to allow other programs to access. Similarly, the monetary transaction program management non-volatile data 140 is non-volatile data managed by the monetary transaction program 122, and is managed by the IC card operating system 123 so as not to allow other programs to access.

The volatile data storing memory 104 stores biometric authentication program management volatile data 150 and monetary transaction program management volatile data 160. The biometric authentication program management volatile data 150 is volatile data managed by the biometric authentication program 121, and is managed by the IC card operating system 123 so as not to allow other programs to access. Similarly, the monetary transaction program management volatile data 160 is volatile data managed by the monetary transaction program 122, and is managed by the IC card operating system 123 so as not to allow other programs to access.

Next, description will be made on the data constituting the biometric authentication program management non-volatile data 130. The biometric authentication program management non-volatile data 130 includes cipher key data 131, biometric information registration data 132, biometric information related data 133, a biometric authentication threshold value 134, user information 135, a biometric authentication history 136, a trial number upper limit value 137 and a remaining trial number 138. The cipher key data 131 is key data to be used for apparatus authentication and cryptographic communications between the IC card 100 and monetary transaction terminal 200. In this embodiment, the cipher key data 131 may be key data of the common key cryptographic scheme such as DES and SES or key data of the public key cryptographic scheme such as RSA and elliptical curve cryptography. The biometric information registration data 132 is biometric information of a subject user to be registered in the IC card at a dedicated window of a monetary facility before using the IC card 100 for monetary transactions, and is managed so as not to be leaked to an outside of the IC card 100. In this embodiment, although a fingerprint pattern or a finger vein pattern is used for the biometric information registration data 132, the present invention is also applicable to other biometric information. Further, although there is only one piece of the biometric information registration data 132 in FIG. 2, the present invention is also applicable to a plurality of pieces of biometric information registration data registered in the IC card 100. The biometric information related data 133 is information associated with the biometric information registration data 133, and is registered in the IC card 100 at the timing when the biometric information registration data 132 is registered. For example, the biometric information related data 133 indicates coordinate values of a center of the fingerprint pattern stored as the biometric information registration data 132. The biometric information related data 133 is data capable of being read from the IC card 100, and is used for generating biometric information collation data at a high precision which data is used by the monetary transaction terminal 200 for the biometric authentication process. The biometric authentication threshold value 134 is a reference value of the inconsistency degree calculated from the biometric authentication registration data 132 and biometric information collation data 151. If the inconsistency degree is smaller than the biometric authentication threshold value 134, it is judged that the biometric authentication registration data 132 and biometric information collation data 151 are both biometric information of the identical subject person. The user information 135 is information on the person registered the biometric information registration data 132, and includes information such as the name of the subject person and a monetary transaction account number. The user information 135 may be registered in the IC card 100 at the timing when the biometric information registration data 132 is registered. The biometric authentication history 136 is history data of past biometric authentication, and includes information on a success or a failure of biometric authentication and information on the inconsistency degree calculated from the biometric authentication registration data and biometric authentication collation data. The trial number upper limit value 137 indicates the maximum number of failures of the biometric authentication process to be executed by using the IC card 100. The remaining trial number 138 indicates the number of permitted failures of the biometric authentication process to be executed by using the IC card 100. The remaining trial number 138 is initially set to the same number as the trial number upper limit value 137, and is decremented by "1" each time the biometric authentication process fails. Therefore, when the value of the remaining trial number 138 becomes "0", the IC card 100 can control not to permit the following biometric authentication process.

Next, description will be made on the data 150 constituting the biometric authentication program management volatile data. The data 150 constituting the biometric authentication program management volatile data 150 includes biometric information collation data 151, an inconsistency degree 152 and a biometric authentication result 153. The biometric information collation data 151 is collation data of a user acquired from the monetary transaction terminal 200. The inconsistency degree 152 indicates quantitatively a difference between the biometric information registration data 133 and biometric information collation data 152, and is calculated in the IC card 100 in accordance with a specific algorithm. The biometric authentication result 153 is a result of comparison between the inconsistency degree 152 and biometric authentication threshold value 134, and indicates whether biometric authentication can identify a user as the subject person.

Figure 3:
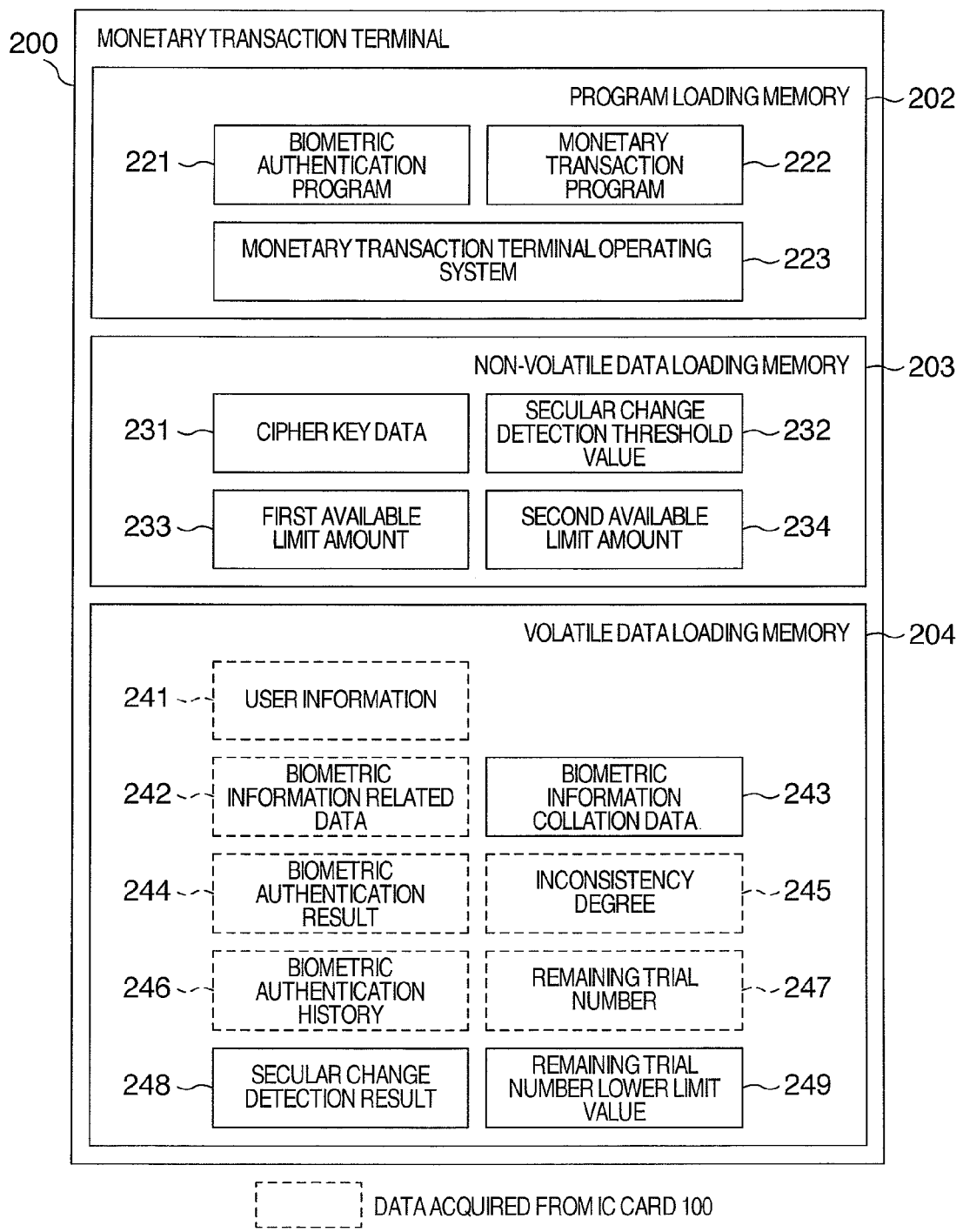
FIG. 3 is a diagram showing the structure of programs and data loaded in a monetary transaction terminal 200.

Next, with reference to FIG. 3, description will be made on the structure of programs and data loaded in the monetary transaction terminal 200. FIG. 3 shows the details of programs stored in the program loading memory 202 of the monetary transaction terminal 200, data stored in the non-volatile data loading memory 203 and data stored in the volatile data loading memory 204. The program loading memory 202 stores a biometric authentication program 221, a monetary transaction program 222 and a monetary transaction terminal operating system 223. The biometric authentication program 221 is an application program to be used for executing a biometric authentication process by controlling the IC card 100. The monetary transaction program 222 is an application program to be used for executing a monetary transaction process by controlling the IC card 100. The monetary transaction terminal operating system 223 is a system program for providing fundamental functions necessary for executing the biometric authentication program 221 and monetary transaction program 222. In this embodiment, any operating system may be used as the monetary transaction terminal operating system 223.

The non-volatile data loading memory 203 stores cipher key data 231, a secular change detection threshold value 232, a first available limit amount 233 and a second available limit amount 234. The cipher key data 231 is key data to be used for apparatus authentication and cryptographic communications between the IC card 100 and monetary transaction terminal 200. In this embodiment, the cipher key data 231 may be key data of the common key cryptographic scheme such as DES and SES or key data of the public key cryptographic scheme such as RSA and elliptical curve cryptography. The secular change detection threshold value 232 is a reference value for detecting whether the biometric information registration data 133 registered in the IC card 100 has become very different from the present biometric information of a user because of a secular change or the like. The first available limit amount 233 indicates an upper limit of an available money amount in a monetary transaction when biometric authentication succeeds. The second available limit amount 234 indicates an upper limit of an available money amount in a monetary transaction when biometric authentication does not succeed.

The volatile data loading memory 204 stores user information 241, biometric information related data 242, biometric information collation data 243, a biometric authentication result 244, an inconsistency degree 245, a biometric authentication history 246, a remaining trial number 247, a secular change detection result 248 and a trial number lower limit value 249. The user information 241 is the user information 135 stored in the IC card 100 and read from the IC card 100. The biometric information related data 242 is the biometric information related data 132 stored in the IC card 100 and read from the IC card 100. The biometric authentication result 244 is the biometric authentication result 153 stored in the IC card 100 and read from the IC card 100. The inconsistency degree 245 is the inconsistency degree 152 stored in the IC card 100 and acquired from the IC card 100. The biometric authentication history 246 is the biometric authentication history 136 stored in the IC card 100 and read from the IC card 100. The remaining trial number 247 is the remaining trial number 138 stored in the IC card and acquired from the IC card 100. The secular change detection result 248 stores a result of detecting whether the biometric information registration data 133 registered in the IC card 100 has become very different from the present biometric information of a user. The trial number lower limit value 249 is a value generated each time the monetary transaction terminal 200 communicates with the IC card 100.

Figure 4:
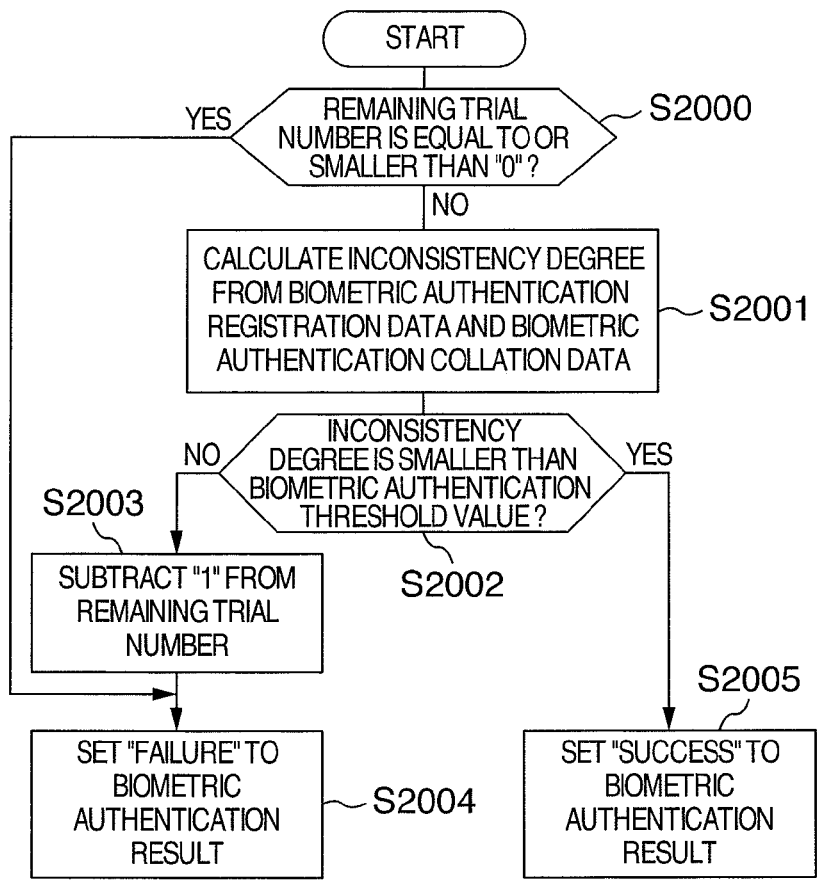
FIG. 4 is a flow chart illustrating biometric authentication to be executed by the IC card 100.

Next, with reference to FIG. 4, description will be made on an example of a process flow of biometric authentication to be executed by the IC card 100. As a program starts, the IC card 100 judges whether the remaining trial number 138 is equal to or smaller than "0" [S2000]. If the remaining trial number 138 is equal to or smaller than "0", the flow advances to Step S2004, whereas if the remaining trial number 138 is neither equal to nor smaller than "0", the IC card 100 compares the biometric information registration data 132 stored beforehand in the IC card 100 with the biometric information collation data 151 acquired from the monetary transaction terminal 200 by using an algorithm such as pattern matching, and calculates the inconsistency degree 152 [S2001]. The present invention is applicable to any algorithm for calculating the inconsistency degree 152. Next, the IC card 100 compares the inconsistency degree 152 calculated at Step S2001 with the biometric authentication threshold value 134 [S2002]. If the inconsistency degree 152 is not smaller than the biometric authentication threshold value 134, the IC card 100 subtracts "1" from the remaining trial number 138 [S2003]. The IC card 100 sets "failure" to the biometric authentication result 153 [S2004]. If the inconsistency degree 152 is smaller than the biometric authentication threshold value 134, the IC card 100 sets "success" to the biometric authentication result 153 [S2005].

Next, with reference to FIG. 5, description will be made on an example of a process flow of secular change detection to be executed by the monetary transaction terminal 200. As a program starts, the monetary transaction terminal 200 compares the inconsistency degree 245 acquired from the IC card 100 with the secular change detection threshold value 232 [S3000]. If the inconsistency degree 245 is larger than the secular change detection threshold value 232, the monetary transaction terminal 200 sets "presence of secular change" to the secular change detection result 248 [S3001]. If the inconsistency degree 245 is not larger than the secular change detection threshold value 232, the monetary transaction terminal 200 sets "absence of secular change" to the secular change detection result 248 [S3002].

Figure 5:
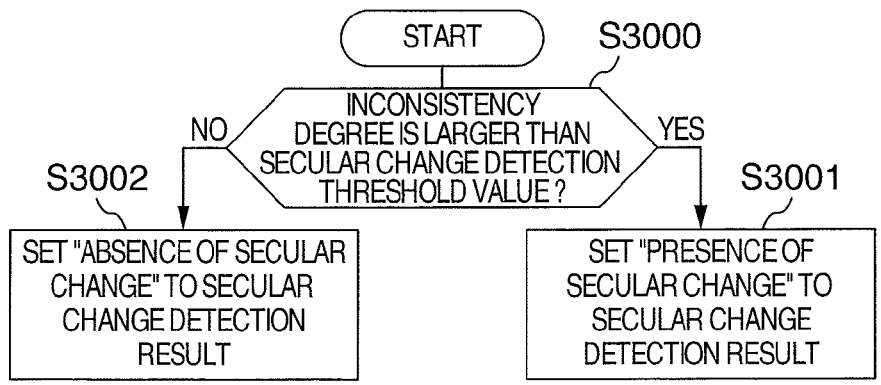
FIG. 5 is a flow chart illustrating secular change detection to be executed by the monetary transaction terminal 200.

Although a secular change is detected by comparing the inconsistency degree 245 with the secular change detection threshold value 232 in FIG. 5, there is a possibility of judging as "presence of secular change" as the inconsistency degree 245 becomes larger than the secular change detection threshold value, even if there is no secular change. For example, it can be considered that the inconsistency degree 245 becomes larger than a normal value, if the biometric sensor 205 does not correctly acquire the biometric collation data of a user because of the influence of external environments or the like. In order to reduce this probability as much as possible, a precision of secular change detection may be improved by referring to the biometric authentication history 246 acquired from the IC card 100. For example, if the past inconsistency degree contained in the biometric authentication history 246 is larger than the secular change detection threshold value 232, it may by possible to judge as "presence of secular change".

Next, description will be made on an example of a command and response to be transmitted and received between the IC card 100 and monetary transaction terminal 200. FIGS. 6A and 6B show formats of an application program select command 500 and an application program select response 501. The application program select command 500 is a command to be transmitted from the monetary transaction terminal 200 to the IC card 100 to select an application program stored in the IC card 100, and stores a command code for identifying the command, a parameter, a command data length, a program identifier for identifying the application program, and a response data length. The application program select response 501 is a response for returning a process result of the application program select command by the IC card to the monetary transaction terminal 200, and stores program related information and a response code.

FIGS. 7A and 7B show formats of an apparatus authentication start command 510 and an apparatus authentication start response 511. The apparatus authentication start command 510 is a command to be transmitted from the monetary transaction terminal 200 to the IC card 100 to start apparatus authentication, and stores a command code for identifying the command, a parameter, a command data length, a terminal random number, and a response data length. The apparatus authentication start response 511 is a response for returning a process result of the apparatus authentication start command 510 by the IC card to the monetary transaction terminal 200, and stores card verification data, a card random number and a response code.

FIGS. 8A and 8B show formats of an apparatus authentication execute command 520 and an apparatus authentication execute response 521. The apparatus authentication execute command 520 is a command to be transmitted from the monetary transaction terminal 200 to the IC card 100 to execute apparatus authentication, and stores a command code for identifying the command, a parameter, a command data length, and terminal verification data. The apparatus authentication execute response 521 is a response for returning a process result of the apparatus authentication execute command 520 by the IC card to the monetary transaction terminal 200, and stores a response code.

Figure 9A:
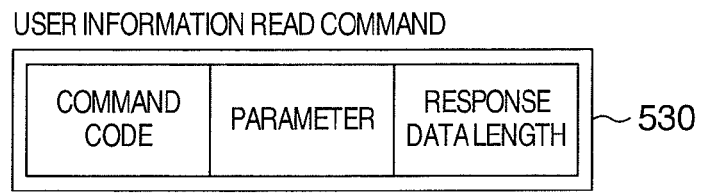
FIGS. 9A and 9B show format of a user information read command 530 and a user information read response 531.
Figure 9B:
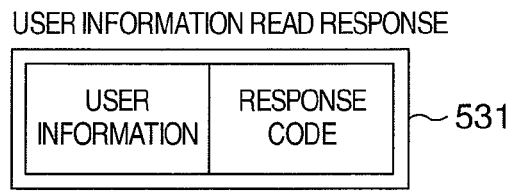

FIGS. 9A and 9B show formats of a user information read command 530 and a user information read response 531. The user information read command 530 is a command to be transmitted to the IC card 100 to make the monetary transaction terminal 200 read user information stored in the IC card 100, and stores a command code for identifying the command, a parameter, and a response data length. The user information read response 531 is a response for returning a process result of the user information read command 530 by the IC card to the monetary transaction terminal 200, and stores user information and a response code.

Figure 10A:
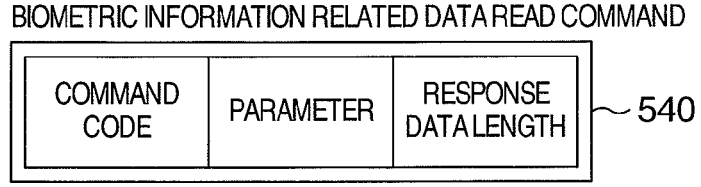
FIGS. 10A and 10B shows formats of a biometric information related data read command 540 and a biometric information related data read response 541.
Figure 10B:
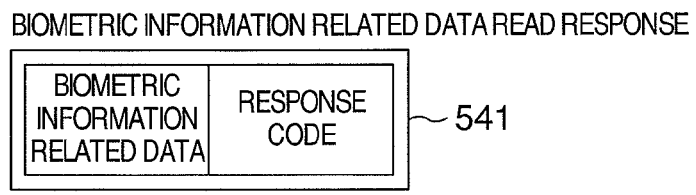

FIGS. 10A and 10B show formats of a biometric information related data read command 540 and a biometric information related data read response 541. The biometric information related data read command 540 is a command to be transmitted to the IC card 100 to make the monetary transaction terminal 200 read biometric information related data stored in the IC card 100, and stores a command code for identifying the command, a parameter, and a response data length. The biometric information related data read response 541 is a response for returning a process result of the biometric information related data read command 540 by the IC card to the monetary transaction terminal 200, and stores biometric information related data and a response code.

Figure 11A:
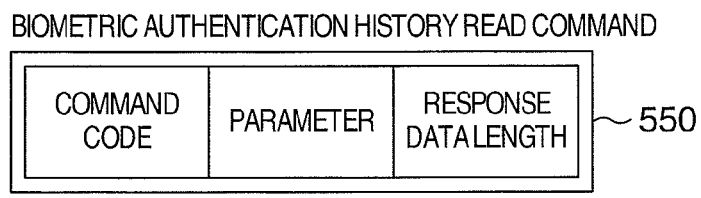
FIGS. 11A and 11B show formats of a biometric authentication history read command 550 and a biometric authentication history read response 551.
Figure 11B:
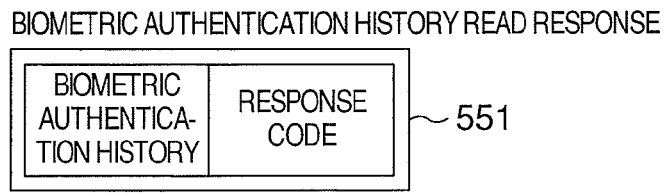

FIGS. 11A and 11B show formats of a biometric authentication history read command 550 and a biometric authentication history read response 551. The biometric authentication history read command 550 is a command to be transmitted to the IC card 100 to make the monetary transaction terminal 200 read a biometric authentication history stored in the IC card 100, and stores a command code for identifying the command, a parameter, and a response data length. The biometric authentication history read response 551 is a response for returning a process result of the biometric authentication history read command 550 by the IC card to the monetary transaction terminal 200, and stores a biometric authentication history and a response code.

Figure 12A:
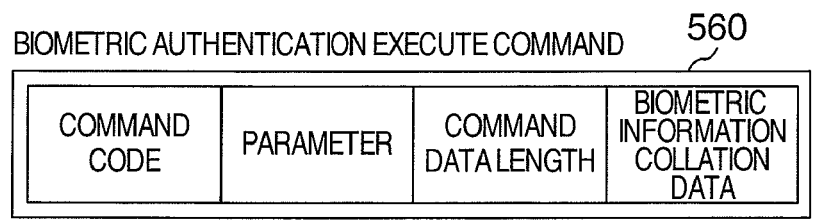
FIGS. 12A and 12B show formats of a biometric authentication execute command 560 and a biometric authentication execute response 561.
Figure 12B:
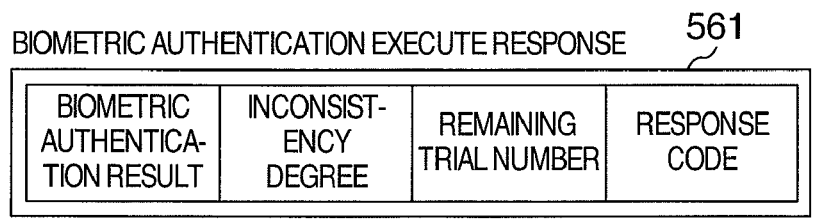

FIGS. 12A and 12B show formats of a biometric authentication execute command 560 and a biometric authentication execute response 561. The biometric authentication execute command 560 is a command to be transmitted from the monetary transaction terminal 200 to the IC card 100 to execute biometric authentication, and stores a command code for identifying the command, a parameter, a command data length, and biometric information collation data. The biometric authentication execute response 561 is a response for returning a process result of the biometric authentication execute read command 560 by the IC card to the monetary transaction terminal 200, and stores a biometric authentication result, an inconsistency degree, a remaining trial number and a response code.

Next, with reference to FIG. 13, description will be made on a process flow between the IC card 100 and monetary transaction terminal 200. The process flow shown in FIG. 13 assumes that the IC card 100 has already entered the state of communicating with the monetary transaction terminal 200. First, in order to select activation of the biometric authentication program 121 in the IC card 100, the monetary transaction terminal 200 transmits the application program select command 500 with the program identifier of the biometric authentication program 121 being set [S1000]. Upon reception of the application program select command 500 with the program identifier of the biometric authentication program 121 being set, the IC card 100 selects activation of the biometric authentication program 121 and returns the application program select response 501 [S1100]. Next, the monetary transaction terminal 200 transmits the apparatus authentication start command 510 and apparatus authentication execute command 520 to the IC card 100 to perform apparatus authentication of the IC card 100 [S1001]. Upon reception of the apparatus authentication start command 510 and apparatus authentication execute command 520, the IC card 100 executes an apparatus authentication process and returns the apparatus authentication start response 511 and apparatus authentication execute response 521 [S1101]. In the apparatus authentication process, a cryptographic process is executed using the cipher key 131 loaded in the IC card 100 and the cipher key 231 loaded in the monetary transaction terminal 200, to mutually confirm that both the apparatus are the authorized apparatus. After the apparatus authentication, key data for enciphering data to be transmitted and received in succeeding IC card communications may be shared. The present invention does not specify a cryptographic algorithm to be used for apparatus authentication and a sharing algorithm for the key data, and the present invention is applicable to any algorithm.

Next, the monetary transaction terminal 200 transmits the user information read command 530 to acquire the user information 135 loaded in the IC card 100 [S1002]. Upon reception of the user information read command 530, the IC card 100 returns the user information read response 531 with the user information 135 being set [S1102]. The monetary transaction terminal 200 temporarily stores the user information acquired from the IC card 100 as the user information 241.

The monetary transaction terminal 200 transmits the biometric information related read command 540 to acquire the biometric information related data 133 loaded in the IC card 100 [S1003]. Upon reception of the biometric information related read command 540, the IC card 100 returns the biometric information related data read response 541 with the biometric information related data 133 being set [S1103]. The monetary transaction terminal 200 temporarily stores the biometric information related data acquired from the IC card 100 as the biometric information related data 242.

The monetary transaction terminal 200 transmits the biometric authentication history read command 550 to acquire the biometric authentication history 136 loaded in the IC card 100 [S1004]. Upon reception of the biometric authentication history read command 550, the IC card 100 returns the biometric authentication history read response 551 with the biometric authentication history 136 being set [S1104]. The monetary transaction terminal 200 temporarily stores the biometric authentication history acquired from the IC card 100 as the biometric authentication history 246.

The monetary transaction terminal 200 reads biometric information of a user with the biometric information sensor 205 to generate the biometric information collation data 243 [S1005]. In order to generate the biometric information collation data 243 at a high precision, the monetary transaction terminal 200 may refer to the biometric information related data 242 previously read from the IC card 100. Next, the monetary transaction terminal 200 transmits the biometric authentication execute command 560 with the biometric information collation data 243 generated at Step S1005 to the IC card 100 to execute the biometric authentication process [S1006]. Upon reception of the biometric authentication execute command 560, the IC card 100 temporarily stores the biometric information collation data as the biometric information collation data 152, and calculates the inconsistency degree 152 and biometric authentication result 153. The method of calculating the inconsistency degree 152 and biometric authentication result 153 has already been described with reference to FIG. 4. The IC card 100 returns the biometric authentication response 561 with the inconsistency degree 152, biometric authentication result 153 and remaining trial number 138 being set, to the monetary transaction terminal 200. The monetary transaction terminal 200 temporarily stores the biometric authentication result, inconsistency degree and remaining trial number set to the biometric authentication execute response 561 as the biometric authentication result 244, inconsistency degree 245 and remaining trial number 247, respectively [S1106].

The monetary transaction terminal 200 judges whether the biometric authentication result 244 is a success or a failure of identifying the subject person [S1007], and in the case of a success of identifying the subject person, the flow advances to Step S1012. In the case of a failure of identifying the subject person, the flow advances to Step S1008 whereat the monetary transaction terminal 200 generates randomly the trial number lower limit value 249 in the range equal to or lager than "1" and smaller than the remaining trial number 247, if the trial number lower limit value 249 is not still generated after the execution of Step S1000 [S1008]. Next, the monetary transaction terminal 200 judges whether the remaining trial number 247 is equal to or smaller than the trial number lower limit value 249 [S1009], and if the remaining trial number 247 is equal to or smaller than the trial number lower limit value 249, the flow advances to Step S1011. If the remaining trial number 247 is larger than the trial number lower limit value 249, the monetary transaction terminal 200 confirms the user whether the subject person is again identified through biometric authentication [S1010]. Confirming the user is performed by using the display function and input function provided by the user interface unit 206 of the monetary transaction terminal 200. If the user accepts to perform again the biometric authentication at Step S1010, the flow advances to Step S1005, whereas if the user rejects to perform again the biometric authentication, the monetary transaction terminal 200 confirms the user whether an available limit amount of monetary transaction can be reduced [S1011]. Confirming the user is performed by using the display function and input function provided by the user interface unit 206 of the monetary transaction terminal 200. If the user judges that the available limit amount can be reduced, the flow advances to Step S1013, whereas if not, the flow advances to Step S1015.

At Step S1012, the monetary transaction terminal 200 executes a secular change detection process. The details of the secular change detection process has already been described with reference to FIG. 5. If a result of the secular change detection process indicates "detection of secular change", an alarm is issued to the user by using the display function and input function provided by the user interface unit 206 of the monetary transaction terminal 200. The flow advances thereafter to Step S1013.

In order to select an activation of the monetary transaction program 122 in the IC card 100, at Step S1013 the monetary transaction terminal 200 transmits the application program select command 500 with the program identifier of the monetary transaction program 122 being set. Upon reception of the application program select command 500 with the program identifier of the monetary transaction program 122 being set, the IC card 100 selects an activation of the monetary transaction program 122, and returns the application program select response 501 [S1113]. Next, the IC card 100 and monetary transaction terminal 200 executes a monetary transaction process in the range of the available limit amount set as a result of the previously executed biometric authentication process [S1014, S1114].

If the user rejects a reduction in the available limit amount of monetary transaction at Step S1011, the monetary transaction terminal 200 provides the user with an indication that monetary transaction cannot be made, by using the display function and input function provided by the user interface unit 206 of the monetary transaction terminal 200 [S1015].

Lastly, the monetary transaction terminal 200 notifies the center 300 of the biometric authentication result and monetary transaction result [S1016]. The center 300 stores a history of past biometric authentication of each user.

Figure 14:
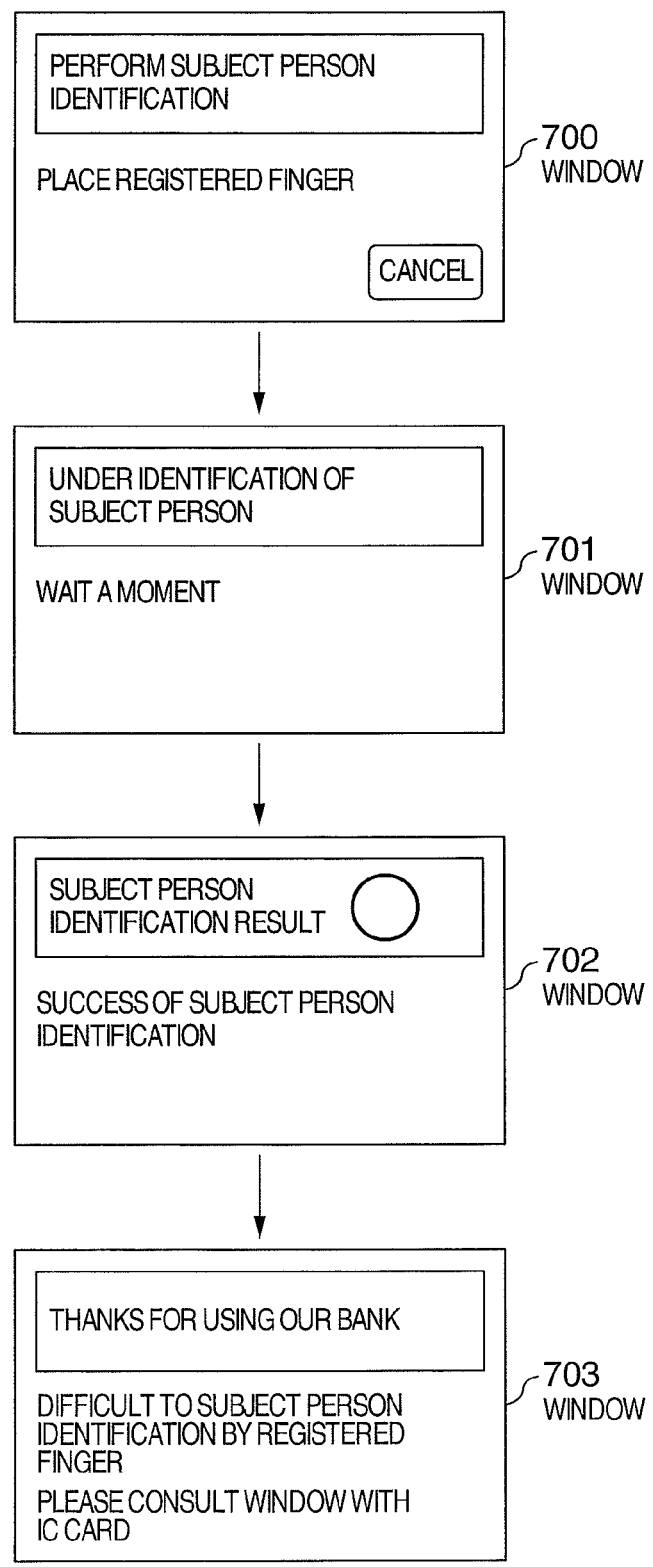
FIG. 14 is an illustrative diagram showing a first example of screen transition displayed by the monetary transaction terminal 200.

FIG. 14 shows an example of screens displayed by the user interface unit 206 of the monetary transaction terminal 200. FIG. 14 shows screen transition when identifying the subject person succeeds and a secular change is detected. In a screen 700, the monetary transaction terminal 200 displays sentences and graphics and reproduces voices in order to guide the user to place a finger on the biometric information sensor 205 of the monetary transaction terminal 200 for biometric authentication. Next, in a screen 701, the monetary transaction terminal 200 displays sentences and graphics and reproduces voices in order to inform the user of biometric authentication under execution. Next, in a screen 702, the monetary transaction terminal 200 displays sentences and graphics and reproduces voices in order to inform the user of a success of subject person identification by biometric authentication. Next, in a screen 703, the monetary transaction terminal 200 displays sentences and graphics and reproduces voices in order to guide the user to a window of the monetary facility, because it is detected that the biometric information registration data 133 registered in the IC card 100 is very different from the present biometric information of the user, during or after a monetary transaction after the screen 702 is displayed.

Figure 15:
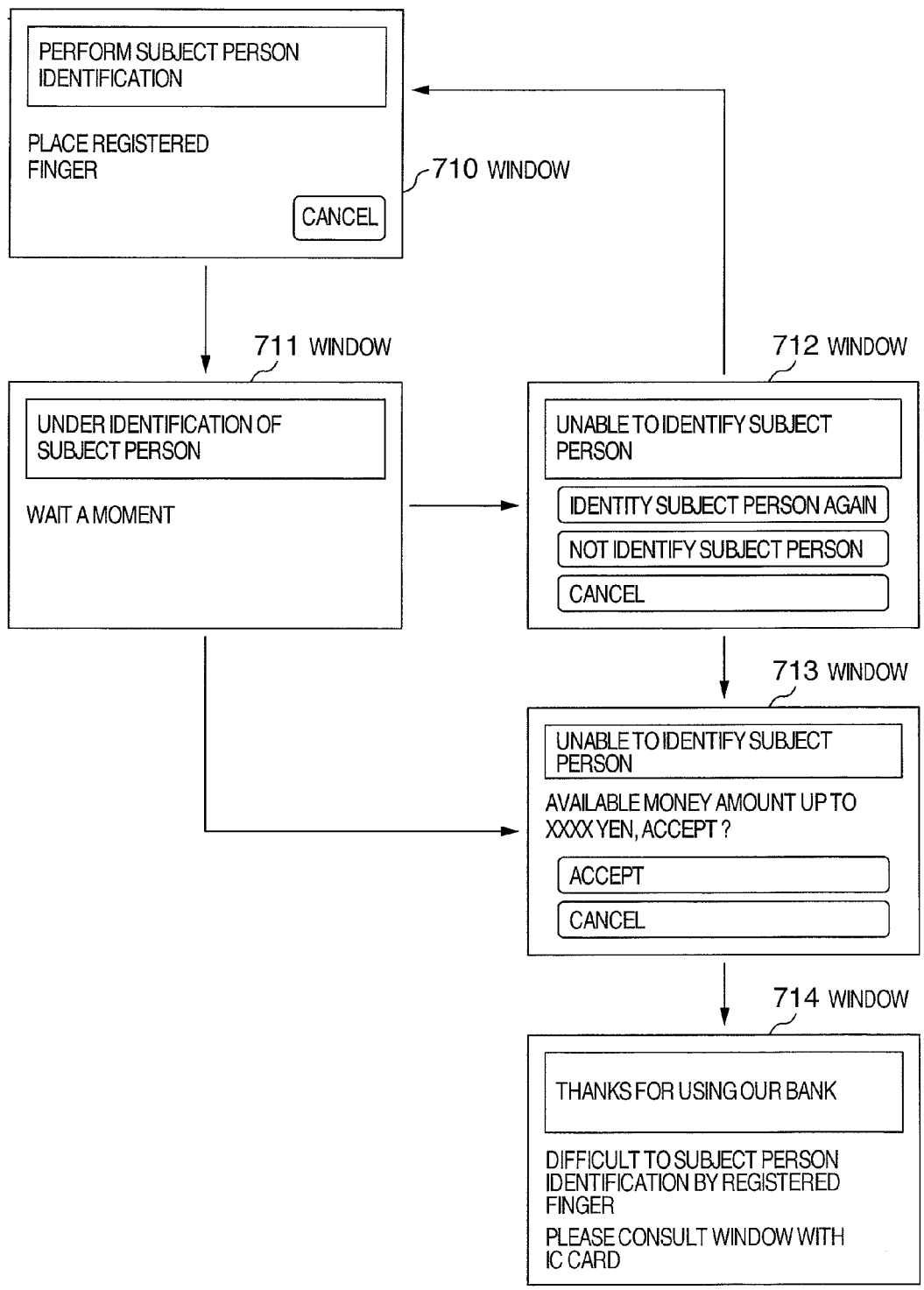
FIG. 15 is an illustrative diagram showing a second example of screen transition displayed by the monetary transaction terminal 200.

As another example of screens displayed by the user interface unit 206 of the monetary transaction terminal 200, FIG. 15 shows screen transition when the subject person biometric authentication fails. First, in a screen 710, the monetary transaction terminal 200 displays sentences and graphics and reproduces voices in order to guide the user to place a finger on the biometric information sensor 205 of the monetary transaction terminal 200 for biometric authentication. Next, in a screen 711, the monetary transaction terminal 200 displays sentences and graphics and reproduces voices in order to inform the user of biometric authentication under execution. Next, in a screen 712, if biometric authentication fails and the remaining trial number 247 is neither equal to nor smaller than the trial number lower limit value 249 at Step S1009 shown in FIG. 13, the subject person identification fails so that the monetary transaction terminal 200 displays the screen to confirm whether the user performs biometric authentication again. If the user selects to perform the subject person identification again, the monetary transaction terminal 200 displays a screen 710 to perform biometric authentication again. If the user selects not to perform the subject person identification, the monetary transaction terminal 200 displays a screen 713. Next, if biometric authentication fails and the remaining trial number 247 is equal to or smaller than the trial number lower limit value 249 at Step S1009 shown in FIG. 13, the subject person identification fails so that the monetary transaction terminal 200 displays the screen to confirm whether the user accepts to reduce an available limit amount of monetary transaction to follow. Next, in a screen 714, the monetary transaction terminal 200 displays sentences and graphics and reproduces voices in order to guide the user to a window of the monetary facility, because it is detected that the biometric information registration data 133 registered in the IC card 100 is very different from the present biometric information of the user, during or after a monetary transaction.

The screens shown in FIGS. 14 and 15 are only illustrative examples, and the present invention is also applicable to a screen configuration that sentences and graphics providing similar effects are displayed.

Second Embodiment

Figure 16:
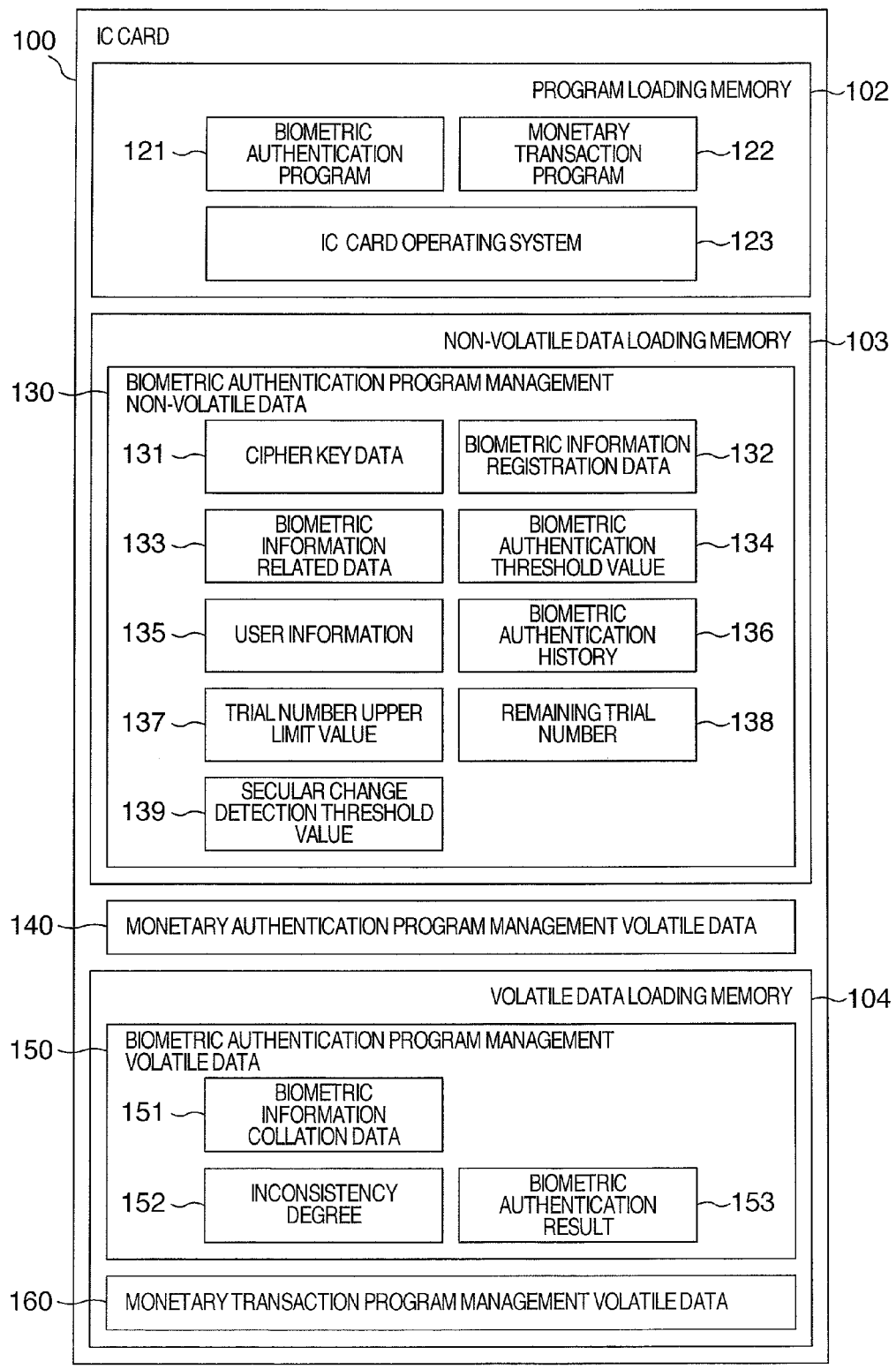
FIG. 16 is a diagram showing the structure of programs and data loaded in the IC card 100 according to a second embodiment.

The second embodiment of the present invention will be described with reference to the accompanying drawings. The second embodiment has the same structure as that of the first embodiment described with reference to FIG. 1. Internal data loaded in the IC card 100 is partially different. FIG. 16 is a diagram showing programs and data loaded in the IC card 100. The second embodiment is different from the first embodiment in that a secular change detection threshold value 139 is loaded in the biometric authentication management non-volatile data 130 of the IC card 100.

Figure 17:
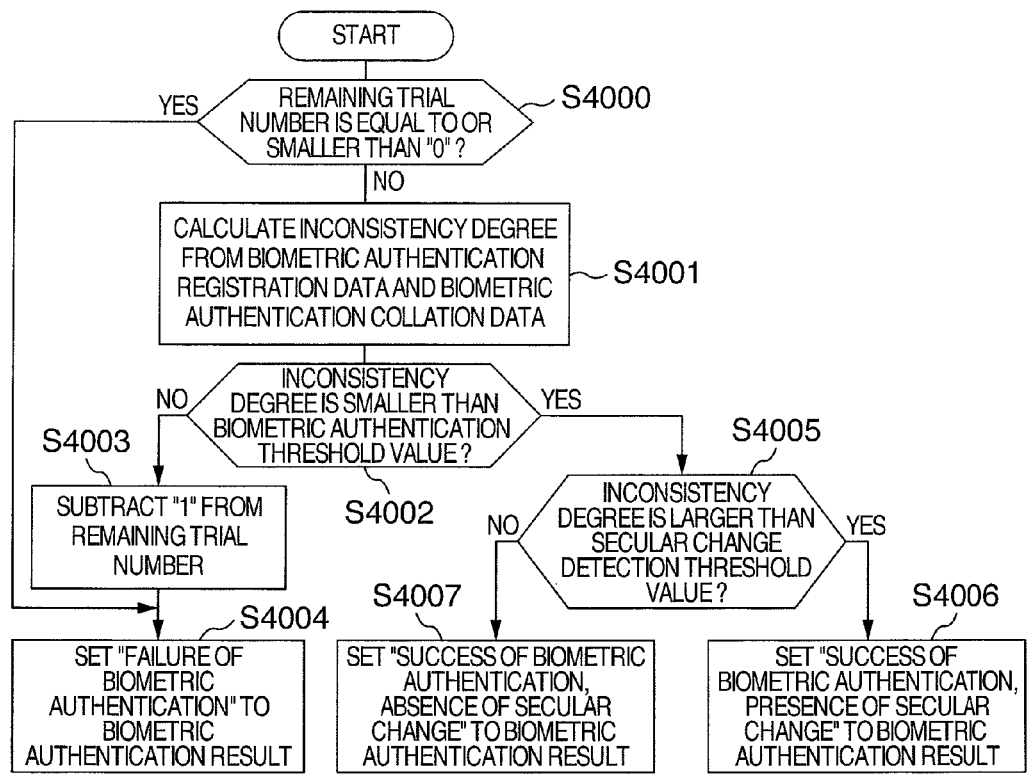
FIG. 17 is a diagram showing the structure of programs and data loaded in the IC card 100 according to a third embodiment.
Figure 18:
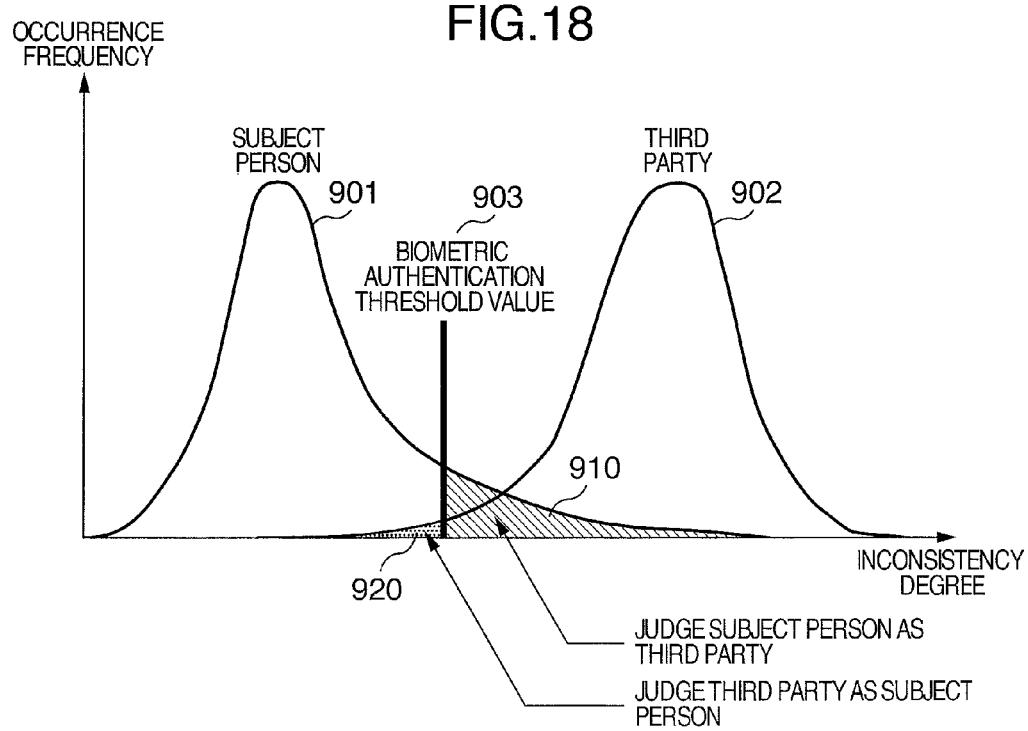
FIG. 18 is an inconsistency degree distribution diagram for registration data and collation data.

Next, with reference to FIG. 17, description will be made on an example of a process flow of biometric authentication to be executed by the IC card 100. As a program starts, the IC card 100 judges whether the remaining trial number 138 is equal to or smaller than "0" [S4000]. If the remaining trial number 138 is equal to or smaller than "0", the flow advances to Step S4004, whereas if the remaining trial number 138 is larger than "0", the IC card 100 compares the biometric information registration data 132 stored beforehand in the IC card 100 with the biometric information collation data 151 acquired from the monetary transaction terminal 200 by using a specific algorithm, and calculates the inconsistency degree 152 [S4001]. The present invention is applicable to any algorithm for calculating the inconsistency degree 152. Next, the IC card 100 compares the inconsistency degree 152 calculated at Step S4001 with the biometric authentication threshold value 134 [S4002]. If the inconsistency degree 152 is not smaller than the biometric authentication threshold value 134, the IC card 100 subtracts "1" from the remaining trial number 138 [S4003]. The IC card 100 sets "failure" to the biometric authentication result 153 [S4004].

If the inconsistency degree 152 is smaller than the biometric authentication threshold value 134 at Step 4002, the IC card 100 compares the inconsistency degree 245 with the secular change detection threshold value 139. If the inconsistency degree 245 is larger than the secular change detection threshold value 139, the IC card 100 sets "biometric authentication success, presence of secular change" to the biometric authentication result 153 [06].

If the inconsistency degree 152 is not larger than the biometric authentication threshold value 134 at Step 4005, the IC card 100 sets "biometric authentication success, absence of secular change" to the biometric authentication result 153 [S4007]

The process flow of biometric authentication to be executed by the IC card 100 has been described with reference to FIG. 17. If it is judged at Step S4006 as "biometric authentication success, presence of secular change", the biometric information registration data 132 may be updated to the biometric information collation data 151. In this case, in the biometric authentication to follow, instead of the biometric information registration data 132, the biometric information collation data 151 is referred to as the registration data. Alternatively, the biometric information collation data 151 may be stored permanently in the IC card 100 as new registration data. In this case, in the biometric authentication to follow, in addition to the biometric information registration data 132, the biometric information collation data 151 is also referred to as the registration data.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A biometric authentication apparatus for identifying a subject person by using biometric information of a user, comprising:
  a biometric information sensor for detecting biometric information;
  a processing unit for executing biometric authentication; and
  a memory for storing data,
  wherein:
  said memory stores a remaining trial number whose value is reduced each time biometric authentication performed by said processing unit fails;
  said processing unit generates a lower limit value which is random and smaller than a remaining trial number at the start of biometric authentication, executes biometric authentication until the reduced remaining trial number becomes equal to or smaller than said lower limit value, and generates alarm data for alarming said user when the reduced remaining trial number is equal to or smaller than said lower limit value;
  said memory stores first biometric information of said user, a biometric authentication threshold value which is a reference value to be used when a failure or a success of biometric authentication of said user is judged by a magnitude of a value, and a change detection threshold value which is a reference value to be used when a presence or an absence of a change detection of said first biometric information of said user is judged by a magnitude of a value; and
  said processing unit acquires second biometric information of said user, compares said first biometric information and the acquired second biometric information to calculate an inconsistency degree quantitatively representative of a difference therebetween, and if the calculated inconsistency degree is smaller than said biometric authentication threshold value and larger than said change detection threshold value, generates notice data for notifying said user of a change detection of said first biometric information.

2. The biometric authentication apparatus according to claim 1, wherein:
  said memory stores a past history of biometric authentication of said user and a secular change detection threshold value which is a reference value to be used when a presence or an absence of a secular change detection of first biometric information of said user is judged by a magnitude of a value; and
  said processing unit generates notice data for notifying said user of a secular change detection of the first biometric information, if a calculated inconsistency degree is larger than said secular change threshold value.

3. The biometric authentication apparatus according to claim 1, wherein:
  biometric information to be calculated by said processing unit is information on a fingerprint or information on a finger vein.

4. A biometric authentication system comprising:
  an IC card; and
  a biometric, authentication apparatus for identifying a subject person through biometric authentication using biometric information of a user, by communicating with said IC card,
  wherein:
  said IC card has a first communication unit for communicating with said biometric authentication apparatus, a first memory for storing data, and a first processing unit for performing biometric authentication, wherein said first memory stores a remaining trial number whose value is reduced each time biometric authentication by said first processing unit fails;
  said biometric authentication apparatus has a second communication unit for communicating with said biometric authentication apparatus and a second processing unit for performing biometric authentication, wherein said second processing unit generates a lower limit value which is random and smaller than a remaining trial number at the start of biometric authentication, executes biometric authentication until the reduced remaining trial number becomes equal to or smaller than said lower limit value, and generates alarm data for alarming said user when the reduced remaining trial number is equal to or smaller than said lower limit value;
  said IC card has said first communication unit for communicating with said biometric authentication apparatus, said first memory for storing biometric information of said user, and said first processing unit for performing biometric authentication, wherein said first processing unit acquires externally second biometric information of said user, and compares said first biometric information with the acquired second biometric information to calculate an inconsistency degree quantitatively representative of a difference therebetween; and
  said biometric authentication apparatus has said second communication unit for communicating with said biometric authentication apparatus, a second memory for storing data, and said second processing unit for performing biometric authentication, wherein said second memory stores a change detection threshold value which is a reference value to be used when a presence or an absence of a change detection of said first biometric information of said user is judged by a magnitude of a value, said second processing unit acquires said inconsistency degree calculated by said IC card, compares the acquired inconsistency degree with said change detection threshold value, and if said inconsistency degree is smaller than said change detection threshold value, generates notice data for notifying said user of a change detection of said first biometric information.

5. A biometric authentication method for performing biometric authentication by biometric information of a user by using an IC card and a biometric authentication apparatus for communicating with said IC card, wherein:
  said IC card records a remaining trial number whose value is reduced each time biometric authentication fails;
  a processing unit generates a lower limit value which is random and smaller than a remaining trial number at the start of biometric authentication, executes biometric authentication until the reduced remaining trial number becomes equal to or smaller than said lower limit value, and generates alarm data for alarming said user when the reduced remaining trial number is equal to or smaller than said lower limit value;
  said IC card records first biometric information of said user, acquires externally second biometric information of said user, and compares aid first biometric information with the acquired second biometric information to calculate an inconsistency degree quantitatively representative of a difference therebetween; and said biometric authentication apparatus records a change detection threshold value which is a reference value to be used when a presence or an absence of a change detection of said first biometric information of said user is judged by a magnitude of a value, acquires said inconsistency degree calculated by said IC card, compares said inconsistency degree with said change detection threshold value, and if said inconsistency degree is larger than said change detection threshold value, detects a change in said first biometric information of said user.

* * * * *